(12) United States Patent
Baguley

(10) Patent No.: US 6,840,439 B1
(45) Date of Patent: Jan. 11, 2005

(54) FRACTION EXPLORATION DEVICE

(76) Inventor: Bruce H. Baguley, 4150 8th SE., East Wenatchee, WA (US) 98802

(\*) Notice: Subject to any disclaimer, the term of this patent is extended or adjusted under 35 U.S.C. 154(b) by 0 days.

(21) Appl. No.: 09/028,713

(22) Filed: Feb. 24, 1998

Related U.S. Application Data

(60) Provisional application No. 60/039,100, filed on Feb. 24, 1997.

(51) Int. Cl.[7] ................................................. G06C 1/00
(52) U.S. Cl. ...................................................... 235/61 R
(58) Field of Search ................................. 235/405, 406, 235/410, 61 R, 61 A, 61 B, 61 C, 61 D, 61 DP, 61 E, 61 F, 61 FA, 61 FC, 61 FB, 61 FD, 61 FE, 61 G, 61 GM, 61 J, 61 K, 61 P, 61 L, 61 M, 61 NV, 61 PS, 84, 85 R, 88 F, 88 G, 88 M, 88 N, 88 RC, 89 R, 89 A, 70 R, 70 A, 70 B, 70 CD, 71 R, 71 A, 78 R, 78 A, 78 F, 78 GM, 78 N, 78 RC; 434/188–216

(56) References Cited

U.S. PATENT DOCUMENTS

| | | | |
|---|---|---|---|
| 142,121 A | 8/1873 | Curtis | |
| 280,772 A | 7/1883 | Tucker et al. | |
| 2,436,352 A | \* 2/1948 | Downs, Jr. | |
| 2,919,498 A | 1/1960 | Hill | |
| 2,926,432 A | 3/1960 | Helberg | |
| 3,003,256 A | 10/1961 | Bernstein | |
| 3,272,431 A | 9/1966 | Dablo | |
| 3,369,745 A | \* 2/1968 | Merz | |
| 3,870,225 A | 3/1975 | Murphy | |
| 3,946,207 A | 3/1976 | Williams | |
| 5,033,200 A | \* 7/1991 | Leung | |

\* cited by examiner

*Primary Examiner*—Michael G. Lee
*Assistant Examiner*—Jamara A. Franklin
(74) *Attorney, Agent, or Firm*—Kolisch Hartwell, P.C.

(57) ABSTRACT

A fraction exploration device for teaching various mathematical principles related to fractions, comprising a base sheet having printed indicia thereon, a ruler attached pivotally to the base sheet. The printed indicia on the base sheet include intersecting grid lines which define a matrix of intersections and a series of parallelograms therebetween. Fractions are located at a plurality of the intersections of the grid lines, each fraction having a numerator, a denominator and a dividing line separating the numerator from the denominator. The dividing line of each fraction is sloped to represent a mathematical relationship of the numerator to the denominator.

20 Claims, 4 Drawing Sheets

FRACTION EXPLORATION DEVICE

CROSS-REFERENCE TO RELATED APPLICATIONS

This application springs from, is based upon, and claims the benefit under 35 U.S.C. § 119, of prior-filed U.S. Provisional Patent Application Ser. No. 60/039,100 entitled, FRACTION EXPLORATION DEVICE filed on Feb. 24, 1997.

BACKGROUND OF THE INVENTION

The present invention relates generally to a mathematical teaching device, and more specifically to a device that teaches various mathematical functions related to fractions.

One embodiment of the device includes a base sheet to which is attached pivotally a ruler. The base sheet is labeled with various fractions, distributed in a hierarchical relationship about the sheet. Each fraction includes a numerator, a denominator and a dividing line separating the numerator from the denominator. The dividing line of each fraction is sloped to represent a mathematical relationship of the numerator to the denominator. For example, the fraction bar may represent graphically the slope of a hypotenuse of a right triangle having a vertical side the length of the numerator, and a horizontal side the length of the denominator.

The base sheet also may be labeled with lines in a grid, the lines crossing to define grid points. The spacing of the lines in the grid may be equidistant, and the crossing of the lines may be perpendicular so that the lines define a series of squares. Alternatively, a first set of lines may be spaced at a first interval, and a second set of lines generally perpendicular and overlapping the first set may be spaced at a second interval, so that the first and second sets of lines collectively define rectangles, but not squares. As a further alternative, the lines defining the grid may be parallel, but the first and second sets need not be perpendicular to each other, so that the lines define a series of parallelograms, that may, but need not be, equilateral.

Preferably, the ruler is attached to the base sheet at a grid crossing, and this attachment defines an origin for the grid. Furthermore, the grid lines define squares, and the ruler is labeled in increments conforming to the unit length of the sides of the squares, along a reference line extending approximately from the grid origin. The ruler is rotatable about the origin, and is clear so that the relationship of the labeling on the ruler to the labeling on the grid may be observed readily. Each fraction is located at a grid point, and the fraction bar for each fraction is oriented to extend along a line from the corresponding grid point to the grid origin. The ruler includes an indicator line extending directly away from the grid origin, so that the indicator line of the ruler closely overlaps the fraction bar for a fraction at a slope approximately equal to the slope of the fraction bar, when the indicator line is aligned with the grid point for the fraction.

Yet other embodiments are envisioned within the scope of the present invention. For example, the ruler could be manufactured with a slot or other external geometry that would allow a marking pen to trace a line along the centerline of the ruler. This could be used in combination with erasable pens, or with a removable, clear, intervening sheet that could be placed between the ruler and the base sheet, so that various tracings and notations could be made by either the teacher or a student. In those embodiments in which the intervening sheet is removable, various tracings could be made for various problems, and the solutions shown on the intervening sheets could be compared by the student and teacher.

In the preferred embodiment, there are 11 vertical lines and 11 horizontal lines defining the grid. The last vertical line further is labeled with the decimal and percentage equivalent of the fractions listed along the line. Alternative quantities of lines could be used to demonstrate use of the device for other base counting systems such as base 8 or base 16.

It is an object of the present invention to explore the interrelationship between various mathematical concepts.

Additional objects and advantages of the present invention will be understood more readily after a consideration of the drawings and the Description of the Operations.

DETAILED DESCRIPTION OF THE PREFERRED EMBODIMENT

Figure 1:
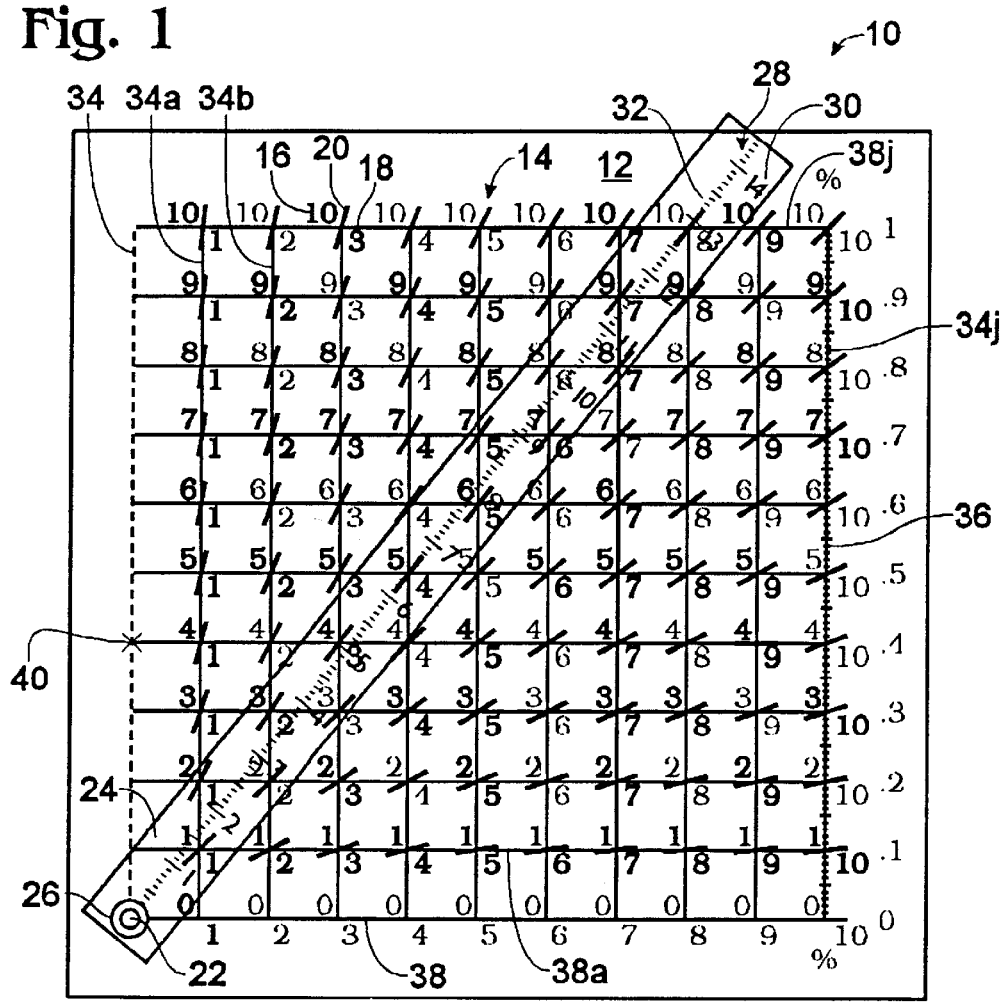
FIG. 1 is a top plan view of an embodiment of the fraction exploration device of the present invention, the centerline of the ruler approximately aligned with the fractions 10/8 and 5/4.

In FIG. 1, a fraction exploration device according to the present invention is shown, including a base sheet 12 and a plurality of fractions 14. Each fraction 14 has a numerator 16, a denominator 18 and a dividing line or fraction bar 20 separating numerator 16 from denominator 18. The dividing line of each fraction is oriented to point toward a predefined focal point 22.

Those fractions 14 that are in lowest terms may be shown in indicia different from those fractions 14 not in lowest terms. For example, in FIG. 1, the fractions 0/1 through 10/1, 1/1 through 1/10, 2/3, 2/5, 2/7, 2/9, 3/2, 3/4, 3/5, 3/7, 3/8, 3/10, 4/3, 4/5, 4/7, 4/9, 5/2, 5/3, 5/4, 5/6, 5/7, 5/8, 5/9, 6/5, 6/7, 7/2, 7/3, 7/4, 7/5, 7/6, 7/8, 7/9, 7/10, 8/3, 8/5, 8/7, 8/9, 9/2, 9/4, 9/5, 9/7, 9/8, 9/10, 10/3, 10/7, 10/9 are shown in bold indicia.

A ruler 24 is attached pivotally to base sheet 12 at origin 22, preferably by a pivot 26 such as a simple grommet or pin. Ruler 24 has an indicator line 28 extending to align with a plurality of fractions 14 as ruler 24 is pivoted about focal point 22. For example, in FIG. 1, indicator line 28 of ruler 24 has been aligned with the fraction 10/8. Indicator line 28 also aligns with the indicia for the fraction 5/4, showing that $5/4$ is the numerical equivalent to $10/8$. If the student desires, extrapolation also can be performed to determine other equivalents, such as the fact that $10/8$ is equivalent to a fraction between $1/3$ and $3/3$, and another fraction between $2/1$ and $1/1$. Indicator line 28 includes indicia 30 and subunit markers 32 so that precise measurements may be made along line 28.

Base sheet 12 also is labeled with indicia to represent intersecting grid lines. A first set of gridlines forms vertical lines 34, including a base vertical line 34, a first vertical line 34a, continuing on to a tenth vertical line 34j. Base vertical line 34 is created in indicia representing a dashed line to remind a user of device 10 that fractions on base vertical line 34 would require division by 0. Since the result of division by zero is an infinite number, no fractions 14 are shown on base vertical line 34. Tenth vertical line 34j includes indicia representing subunit markers 36 so that precise measurements may be made along line 34j.

A second set of gridlines forms horizontal lines 38, including a base horizontal line 38, a first horizontal line 38a, continuing on to a tenth horizontal line 38j. First set of lines 34 and second set of lines 38 collectively define a grid having a matrix of intersections or crossings 40, and also define a series of parallelograms therebetween. The indicia for fractions 14 preferably are located so that each fraction bar 20 is bisected by a grid point 40.

Furthermore, fractions 14 preferably are arranged in hierarchical order. Still referring to FIG. 1, base vertical line 34 is not labeled. The next vertical line 34a is labeled with fractions 14, beginning with the fraction $0/1$ and extending to $10/1$. The next vertical line 34b is labeled with fractions beginning with $0/2$ and extending to $10/2$. This pattern is repeated up to last vertical line 34j, labeled as $0/10$ through $10/10$.

Figure 2:
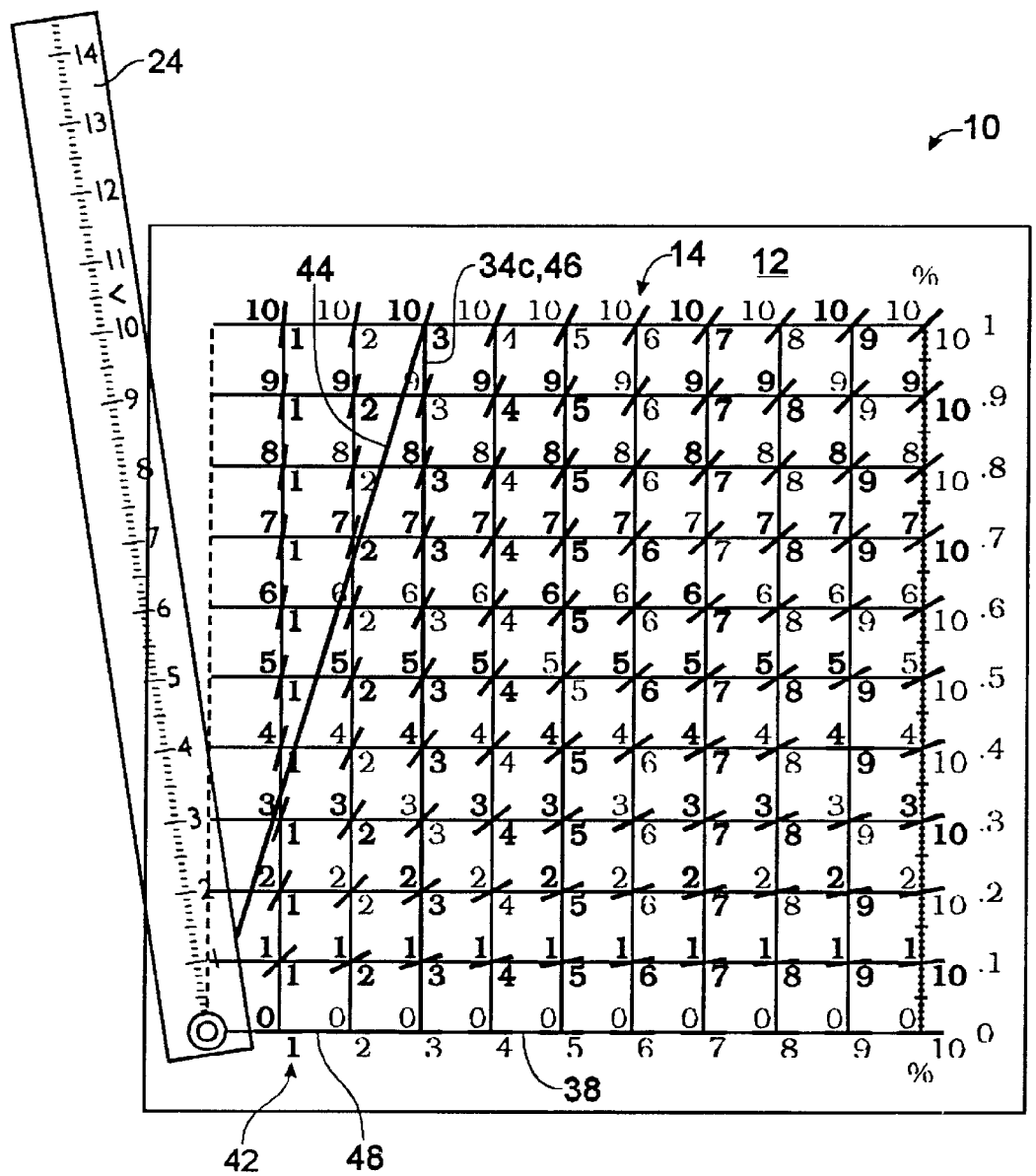
FIG. 2 is a plan view of the device of FIG. 1, with a triangle drawn to represent the fraction 10/3, and the centerline of the ruler marked to show the length of the hypotenuse of this triangle.

Ruler 24 is labeled in incremental units 30 along indicator line 28 so that a distance between grid points 40 that align with indicator line 28 may be measured. Units 30 preferably are spaced equal to the spacing between lines 34 and lines 38, so that the increments on the ruler may be used to measure the hypotenuse of triangles defined by selected grid lines 34 and 38, and indicator line 28 of ruler 24. For example, in FIG. 2, indicator line 28 is marked for the fraction $10/3$, and a triangle 42 is defined, with a hypotenuse 44 traced from near the origin to the fraction $10/3$, a vertical side 46 traced along third vertical line 34c and a horizontal side 48 traced along base horizontal line 38, as shown in thicker lining. Hypotenuse 44 then may be measured as being between 10 and 11 units long, as marked. The markings added in FIG. 2 to base sheet 12 and ruler 24 are best made with a non-permanent marker, such as a dry-erase pen for use with overhead projectors and white boards, so that device 10 may be reused as needed.

Figure 3:
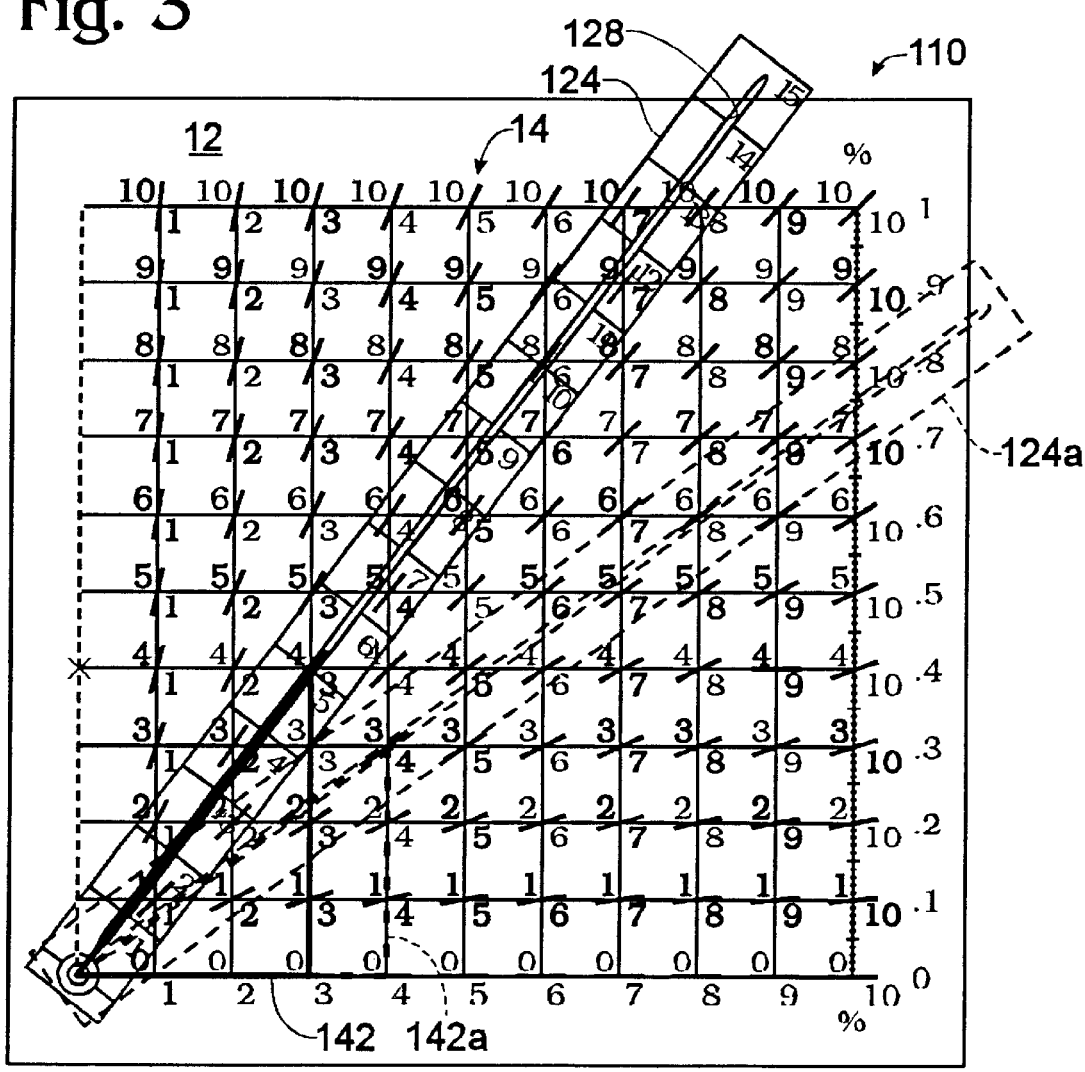
FIG. 3 is a top plan view of an alternative embodiment to the device shown in FIG. 1, with a ruler aligned with the fraction 4/3 to demonstrate the Pythagorean Theorem, also demonstrated in dashed lines for the fraction 3/4.

In FIG. 3, an alternative embodiment of the device is shown as 110. Base sheet 12 and its indicia are as shown and described with respect to FIGS. 1 and 2. Ruler 124 differs in that it is formed with a slot 128 defining the indicator line for ruler 124. Other external geometry may be used for ruler 124 to define similarly a stencil that allows a marking pen to trace a line along the indicator line of ruler 124. This could be used in combination with erasable pens, or with a removable, clear, intervening sheet that could be placed between ruler 124 and base sheet 12. Various tracings and notations then could be made by either the teacher or a student. In those embodiments in which the intervening sheet is removable, various tracings could be made for various problems, and the solutions shown on the intervening sheets could be compared to one another by the student and teacher.

Still referring to FIG. 3, device 110 is shown demonstrating the Pythagorean Theorem. Indicator line 128 of ruler 124 is aligned with the grid point 40 labeled with indicia representing $4/3$, and a triangle 142 has been drawn to trace the lines defined therebetween. By measuring along ruler 124, it will be seen that the hypotenuse of triangle 142 is 5. The same demonstration could be obtained by aligning the indicator line with $3/4$, as shown in dashed lines in FIG. 3, defining triangle 142a.

Figure 4:
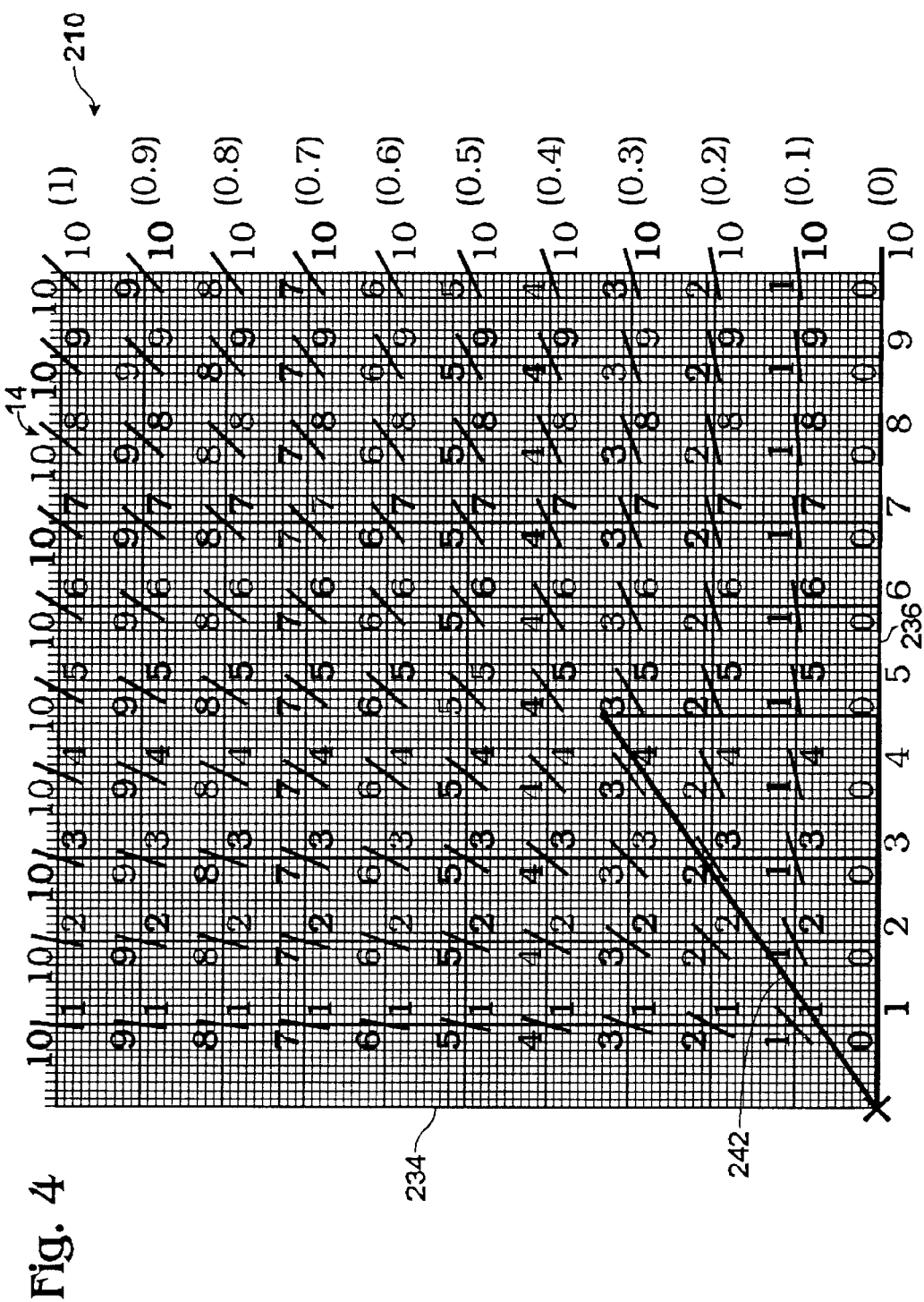
FIG. 4 is a top plan view of an alternative embodiment to the device shown in FIG. 1.

A further alternative embodiment of the device of the present invention is illustrated in FIG. 4. In this embodiment, a grid 210 is defined by numerous vertical and horizontal lines to obtain a precision of placement of fractions not available with the grid shown in FIGS. 1 through 3. The resulting grid measures approximately 100 lines 234 by 100 lines 236. Grid 210 is particularly useful for representing decimal fractions such as $3.3/4.7$ or $0.33/0.47$, and their relationship to whole number fractions such as $33/47$ (represented by triangle 242), or other fractions such as $3/4$, $30/40$, $4/4$, $40/40$, $4/5$, $40/50$, $3/5$ and $30/50$.

In the embodiment of grid 210 shown in FIG. 4, each grid point could be labeled with a fraction indicating whole number fractions ranging from $1/100$ through $100/1$, if desired. This labeling has not been applied to FIG. 4 because it would be so small that it would be difficult to read the fractions with the naked eye. If such labeling is to be used, the device preferably would be manufactured on a scale of at least two-feet by two-feet that would allow human-readable fractions at each grid point.

From the foregoing identification of the elements of the fraction exploration device, numerous mathematical procedures may be performed. One such procedure demonstrates the whole-number relationship between various fractions, as discussed with respect to FIG. 1. Another demonstrates the length relationship between a hypotenuse and sides of a triangle, as discussed with respect to FIGS. 2 and 3.

Numerous other mathematical operations and demonstrations may be performed with the present device, as will be understood readily by those having skill in the art. The type of concepts that the student can explore using the present device ranges from the simple to the fairly complex. It starts with the study of fractions, moves on to geometry and number theory, and includes linear algebra. The device can be used to help students understand elementary concepts or do extensions into deeper mathematical subjects. The following are examples of these concepts.

1. Show the equivalence of two fractions.

2. Indicate when a fraction is in lowest terms.

3. Show what a fraction is when reduced to lowest terms.

4. Show a geometric representation of lowest terms.

5. Show when one fraction is less (or greater) than another.

6. Allow exploration of similar right triangles.

7. Explore ratio and proportion.

8. Change fractions to decimals.

9. Find fractions close in value to a given decimal.

10. Change fractions to percent.

11. View the graph of linear functions of the form y=mx.

12. Explore the concept of the slope of the line y=mx.

13. Work with Pic's Theorem.

14. Explore determinants.

15. Work with the Pythagorean Theorem.

16. View addition of fractions in another way.

17. View multiplication of fractions in another way.

18. Play with Farey Numbers.

Answers to the following lesson questions may be explored with the fraction exploration device.

1. Equivalence: When are two fractions equal? Why are two fractions equal? How do we tell two fractions are equal?

2. Lowest terms: What does it mean for a fraction to be in lowest terms? How is that manifested on fraction exploration device 10?

3. Visible from origin: What does "visible from the origin" mean? What property do fractions that are visible from the origin have?

4. Similar triangles: What are "similar triangles?" How are they represented on fraction exploration device 10?

5. Ratio and proportion: What does the ratio a/b mean? How is it represented on fraction exploration device 10? How do you solve a proportion like a/b=x/c on fraction exploration device 10?

6. Less than: When is one fraction less than another? How do we tell when one fraction is less than another?

7. Greater than: When is one fraction greater than another? How do we tell when one fraction is greater than another?

8. Changing fractions to decimals: What does a decimal mean? How do we change a fraction to a decimal?

9. Finding fractions close to decimals: Is every decimal equivalent to a fraction? How do we estimate a fraction that is close to a decimal? Can we tell which fraction is closer in value to a decimal?

10. Percent: How do you find percent on the device? How do we convert from fractions to decimals or percent?

11. Line: What lines from analytic geometry can be represented on fraction exploration device 10? What does the "m" in the equation y=mx correspond to on fraction exploration device 10?

12. Slope: What is slope? How does it relate to fraction exploration device 10?

13. Pic's Theorem: What is Pic's Theorem and how is it used? Proof?

14. Determinants: What is a "determinant" and how does it relate to an integral lattice?

15. Pythagorean Theorem: What is the Pythagorean Theorem? How can it be checked on fraction exploration device 10?

16. Adding fractions: What is the manifestation of adding fractions on fraction exploration device 10?

17. Multiplying: What is the manifestation of multiplying fractions on fraction exploration device 10?

18. Farey Numbers: What is the definition of a Farey series? Give examples of Farey series. Give properties of the Farey Numbers. What is the relationship of fraction exploration device 10 and Farey Numbers?

While the present invention has been shown and described with reference to the preferred embodiment, it will be apparent to those skilled in the art that other changes in form and detail may be made therein without departing from the spirit and scope of the invention as defined in the appended claims.

I claim:

1. A fraction exploration device for teaching various mathematical principles related to fractions, comprising a base sheet having printed indicia thereon, wherein the printed indicia include:

intersecting grid lines which define a matrix of intersections and a series of parallelograms therebetween; and fractions located at a plurality of the intersections of the grid lines, each fraction having a numerator, a denominator and a dividing line separating the numerator from the denominator, wherein the dividing line of each fraction is sloped to represent a mathematical relationship of the numerator to the denominator.

2. The fraction exploration device according to claim 1, wherein the grid lines are spaced approximately uniformly.

3. The fraction exploration device according to claim 1, wherein one of the intersections is a predefined origin for the grid and the dividing line of each fraction is oriented to point toward the origin of the grid.

4. The fraction exploration device according to claim 3, further comprising a ruler attached pivotally to the base sheet at the origin, the ruler having an indicator line extending to align with a plurality of the fractions as the ruler is pivoted about the origin.

5. The fraction exploration device according to claim 4, wherein the indicator line is defined by an elongate stencil formed in the ruler so that a writing instrument may be inserted into the stencil to trace a line on the base sheet.

6. The fraction exploration device according to claim 4, wherein the grid lines are spaced approximately uniformly.

7. The fraction exploration device according to claim 4, wherein the indicator line of the ruler is labeled in incremental units so that the distance between intersections that align with the indicator line may be measured.

8. The fraction exploration device according to claim 7, wherein the fractions are arranged in hierarchical order.

9. The fraction exploration device according to claim 7, wherein the grid lines are spaced approximately uniformly.

10. The fraction exploration device according to claim 9, wherein the incremental units of the indicator line are sized to match approximately the spacing between the grid lines.

11. The fraction exploration device according to claim 10, wherein the fractions are arranged in hierarchical order.

12. The fraction exploration device according to claim 9, wherein the fractions are arranged in hierarchical order.

13. The fraction exploration device according to claim 4, wherein the fractions are arranged in hierarchical order.

14. The fraction exploration device according to claim 3, wherein the grid lines are spaced approximately uniformly.

15. The fraction exploration device according to claim 3, wherein the fractions are arranged in hierarchical order.

16. The fraction exploration device according to claim 1, wherein the fractions are arranged in hierarchical order.

17. The fraction exploration device according to claim 1, wherein at least one of the fractions is in lowest terms such that the numerator cannot be divided by the denominator to obtain a whole number, and is printed on the base sheet with indicia that graphically highlight the at least one of the fractions from at least one other of the fractions.

18. An educational device, comprising:
- a base sheet having an array of fractions printed thereon and a predefined focal point, wherein each fraction has:
  - a numerator and a denominator printed on the sheet in a predefined spatial relationship, and
  - a dividing line printed on the sheet to separate graphically the numerator from the denominator, and sloped to represent graphically a mathematical relationship of the numerator to the denominator; and
- a ruler pivotally mounted to the base sheet at the focal point, having an indicator line so that the ruler may be pivoted about the focal point to align the indicator line with various ones of the fractions.

19. An educational device, comprising:
- a base sheet having an array of fractions printed thereon and a predefined spatial focal point, wherein each fraction has:
- a numerator and a denominator printed on the sheet in a predefined spatial relationship, and a line printed on the sheet between the numerator and the denominator and sloped to represent graphically a mathematical relationship of the numerator to the denominator by the visual inclination of the line.

20. An educational device, comprising:
- a base sheet having an array of fractions printed thereon and a predefined focal point, wherein each fraction has:
  - a numerator and a denominator printed on the sheet in a predefined spatial relationship, and
  - a dividing line printed on the sheet to separate graphically the numerator from the denominator, and sloped to point toward the focal point; and
- a ruler pivotally mounted to the base sheet at the focal point, having an indicator line so that the ruler may be pivoted about the focal point to align the indicator line with various ones of the fractions.

* * * * *